L. A. SUBERS.
MACHINE FOR CONSTRUCTING A LAMINATED COHESIVE INTERWOVEN BAND.
APPLICATION FILED DEC. 30, 1911.

1,189,751. Patented July 4, 1916.

Witnesses
Ernest Mosman
F. H. Townsend

Inventor
Lawrence A. Subers
By
Attorney

UNITED STATES PATENT OFFICE.

LAWRENCE A. SUBERS, OF CLEVELAND, OHIO.

MACHINE FOR CONSTRUCTING A LAMINATED COHESIVE INTERWOUND BAND.

1,189,751.  Specification of Letters Patent.  Patented July 4, 1916.

Application filed December 30, 1911. Serial No. 668,625.

*To all whom it may concern:*

Be it known that I, LAWRENCE A. SUBERS, a citizen of the United States, and resident of Cleveland, in the county of Cuyahoga and State of Ohio, have invented certain new and useful Improvements in Machines for Constructing a Laminated Cohesive Interwound Band, of which I do hereby declare the following to be a full, clear, and exact description, such as will enable others skilled in the art to which it appertains to make and use the same.

The objects of the invention are to provide efficient and practical means for forming a laminated-cohesive-interwound fabric band, consisting of yarn elements.

The machine further embodies elements of improvement in practicability and efficiency over my former devices as described and illustrated in my prior applications Serial No. 600,314, filed December 15th, 1910, Serial No. 600,315, filed December 31st, 1910, and Serial No. 634,982, filed June 23rd, 1911, in which specially constructed and designed reels revolving in opposite directions are shown rotating about a hollow forming tube or mandrel to laminate the yarn elements thereon, and wherein the fluid rubber is forced from the open mouth of the forming tube into the hollow band after it has been formed upon the forming tube and before being collapsed into a flat band. In these prior applications it is shown that the material upon the band is solidified and dried by passing the same over and between rollers having a polished surface placed at some distance apart in a vacuum chamber. It was further shown in said applications that the yarn elements consisting of a series of yarns lying parallel to each other, when being laminated upon a forming tube or mandrel, had rubber cement or other adhesive material distributed in the yarns to a certain extent, but not in a sufficient manner to coact, permeate and cover all of the yarn elements before actual lamination of the same took place upon the forming tube or mandrel. It was, therefore, found that if a more efficient and uniform distribution of the fluid rubber cement could be obtained by coating and permeating the yarn elements, strands or fibers, or band elements separately out of contact with each other prior to the point of laminating them upon the forming tube or mandrel, that a more perfectly frictioned and complete band would be achieved, since in the machine described in my prior applications it had been found impossible to insure the complete coating of all parts of the yarn elements at the points of crossing each other, thereby leaving insufficiently coated portions of the yarn elements after the band had been fully laminated, compressed and finished, and further difficulty had been experienced in retaining the perfect compressed or interwound form in the band when passing from one revolving roller to another with intervening spaces; since the band had a tendency to constantly resume its cylindrical or rope-like form until the rubber cement or other adhesive material had been completely solidified by the means described or otherwise.

To overcome the many difficulties experienced in the machines as described in the former applications above enumerated, this mechanism or machine is designed for automatically and separately coating and permeating to a degree each yarn element prior to forming the band upon the forming tube or mandrel, and also for exposing each yarn element to the action of the vacuum and heat contained in said vacuum chamber prior to lamination and to evaporate at the same time the solvent liquids contained in the vulcanizable rubber cement. This mechanism also comprises means for guiding in separate channels of a predetermined width and depth the yarn elements so that they cannot come in contact with each other while passing through the rubber cement or become entangled in any manner prior to being laminated upon the forming tube or mandrel. These guiding yarn element channels also serve to deliver the yarns to the forming tube at a certain predetermined definite angular relation to each other.

A further object of the invention is to provide means whereby the yarns or other flexible elements of a tubular fabric can be interwound at a relatively large angle to the length of the fabric and can then be changed to a smaller angle to reduce the stretch of the fabric.

The above mentioned parts are employed together with a pulling device for the laminated interwound fabric band and a pushing device which tends to equalize the forward movement of the yarn elements and prevents the same from being under too much tension, and which lessens the strain thereon as the band comes off the forming tube, and which also prevents to a certain extent the narrowing of the band and eliminates the possibility of the same lapsing into a roped condition.

The shoes which form a part of the pushing off device are also transversely channeled to form open spaces thereon for the exposure of the yarn elements to the vacuum and heat so that the action of eliminating the solvents in the rubber cement and the drying of the coating thereon, will proceed uniformally all around the band.

The invention further comprises as described in my former application Serial No. 634,982, filed June 23rd, 1911, mechanical means for changing the yarn elements to any predetermined angle upon the forming tube or mandrel so that the extensibility of the finished cylindrical compressed band can be controlled according to the angle at which the yarn elements are laminated, as for instance, at 5°, 7°, or 10°, or at a greater or less angle as may be desired.

The combination of heat, vacuum and the mechanism as described are absolutely essential for the successful construction of a laminated-cohesive-interwound band formed of yarn elements or other suitable materials.

Figure 1:
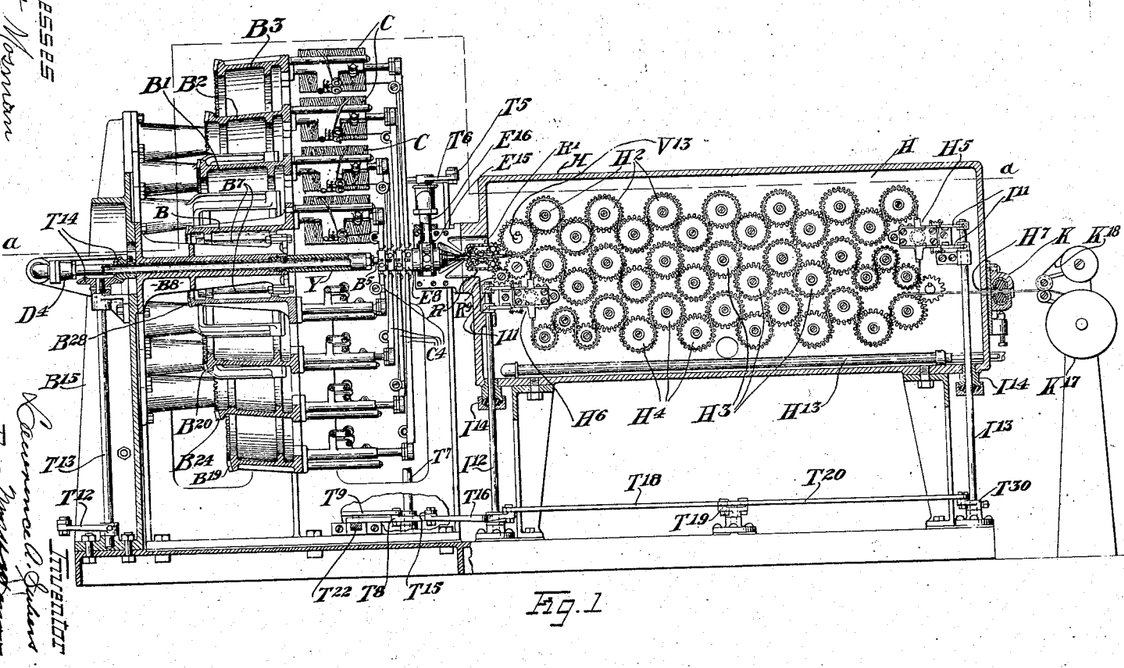
Figure 1 is a longitudinal central section of the complete machine through the band forming coating and drying mechanism.
Figure 4:
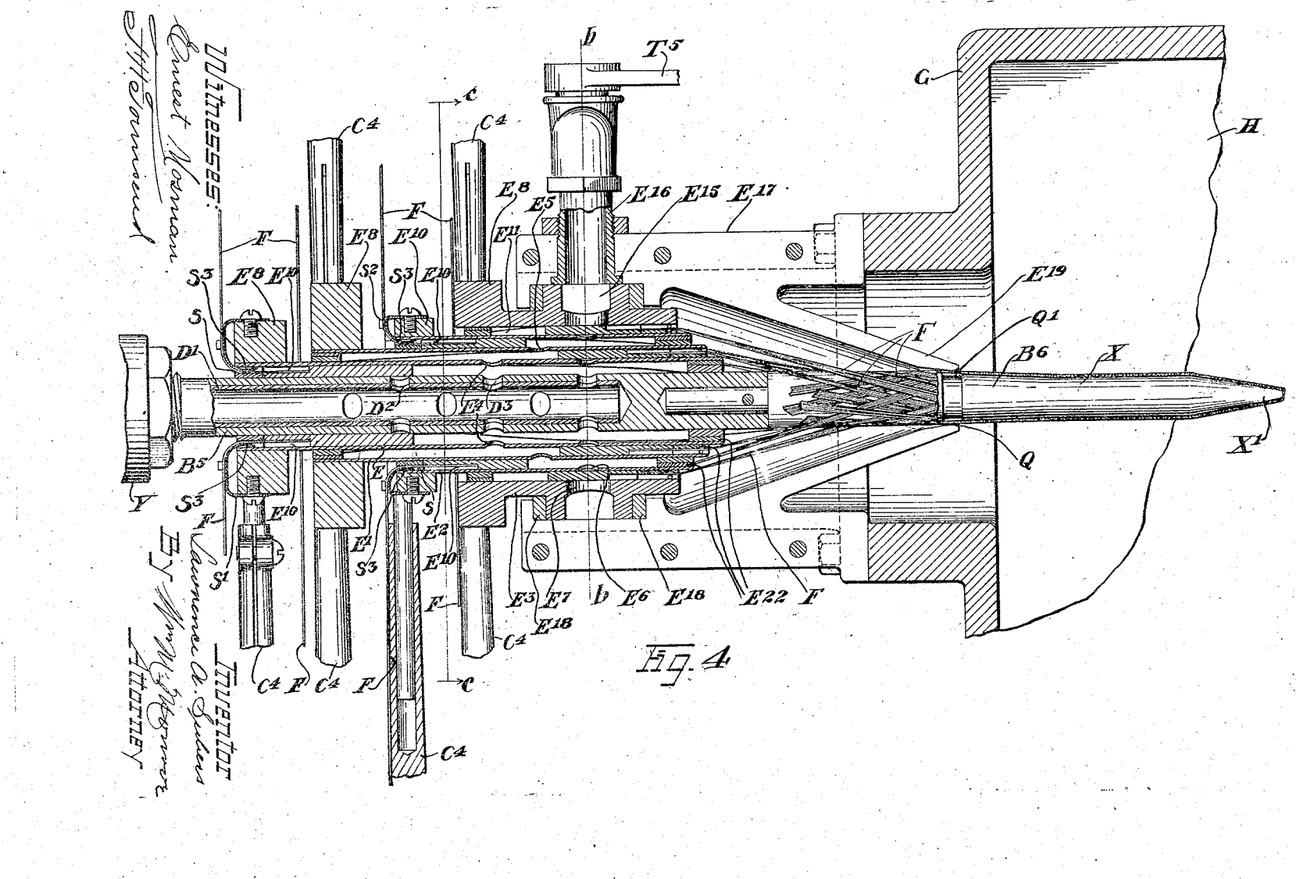
Fig. 4 is a central longitudinal section of the forming tube and the concentric rotating cylinders containing the rubber for coating and permeating the yarn elements, showing means for supplying fluid rubber thereto, and also showing in the cylinder walls the guide grooves in which the yarn elements are guided to the forming tube. In this view valves are shown which automatically shut off the supply of rubber when the machine stops, and which also automatically open when the machine is started.

In my former application Ser. No. 634,982, the reels rotating in opposite directions and carrying rotatable spools have been described, so that a mere résumé of the parts which characterize this portion of the mechanism will suffice. In Figs. 1 and 4 these are shown clearly.

Figures 3, 11:
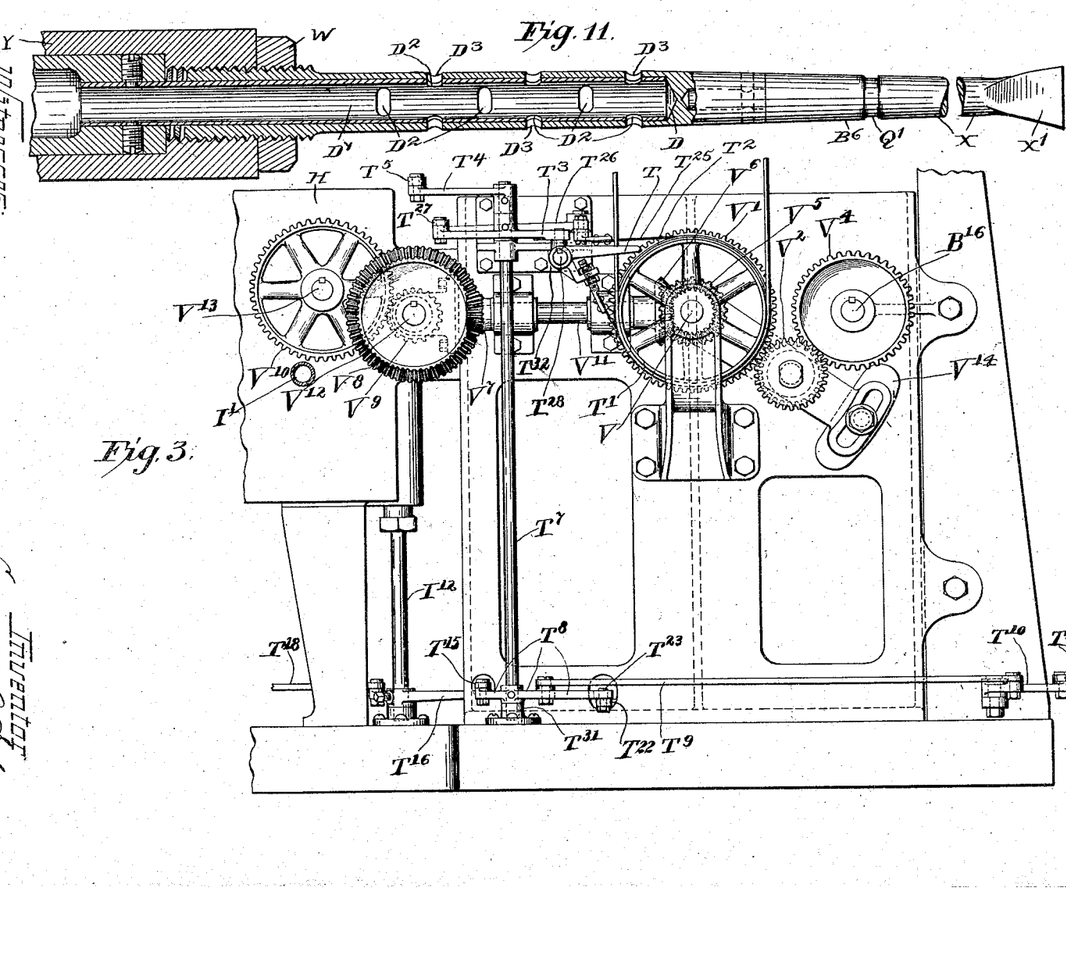
Fig. 3 is a rear elevation of the band forming operating mechanism, showing it operatively connected with the coating and drying mechanism and supporting frame therefor.
Fig. 11 is a plan view of the forming tube on which the yarn elements are wound with a portion in section to show its construction and the hollow part for the passage of rubber and the openings for the emergence of the same.

$B$, $B'$, $B^2$ and $B^3$ are four reels arranged to rotate, one within the other, about a central stationary standard $B^8$ on the frame $B^{15}$ having a tubular passage for fluid rubber. Upon the outer extremity of this standard is secured the tube Y as shown in Fig. 1, and upon this is secured the forming extremity or mandrel $B^5$ having a tapered extremity $B^6$ terminating in a cylindrical portion of less diameter X as shown in Fig. 11. The inner reel B is mounted upon the rollers $B^7$ secured in the arms of $B^{26}$, $B^{29}$ of the standard $B^8$ mounted upon the frame $B^{15}$.

Figure 2:
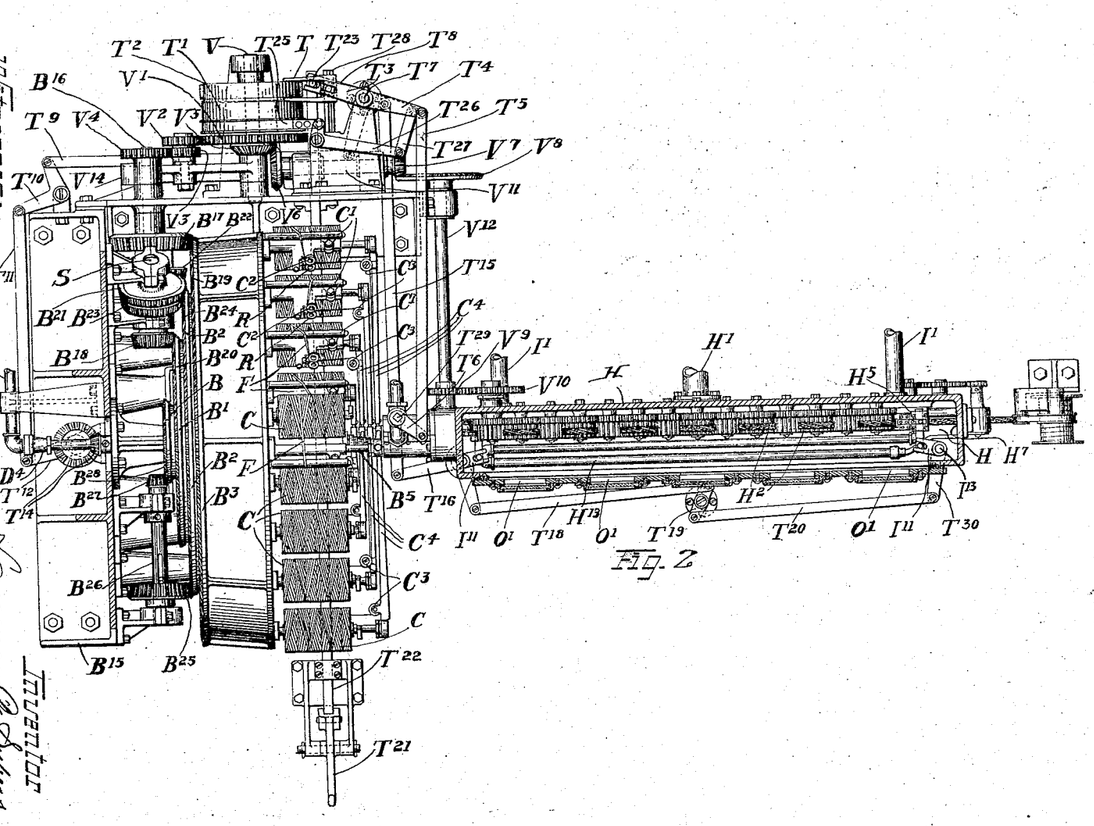
Fig. 2 is a horizontal section of the machine on line $a$—$a$ Fig. 1, showing the band forming and drying mechanism in place and the operating means therefor.

A reel operating shaft $B^{16}$ is shown in Figs. 2 and 3 which is provided with two bevel gears $B^{17}$ and $B^{18}$ which engage the marginal gears $B^{19}$ and $B^{20}$ on the respectively second and fourth reels $B'$ and $B^3$, and revolve them in the same direction. The other reels, viz, the first and third B and $B^2$ are revolved in the reverse direction by means of the bevel gear $B^{21}$ on the short shaft S engaging the gear $B^{22}$ on the reel operating shaft $B^{16}$, and the intermediate bevel gear $B^{23}$ which engages the marginal gear $B^{24}$ on the third reel $B^2$. The marginal gear $B^{24}$ engages a bevel gear $B^{27}$ on a shaft $B^{26}$ and a second bevel gear $B^{27}$ on this shaft drives the first reel B by means of its marginal gear $B^{28}$.

Upon each reel is mounted a predetermined number of rotatable spools C, C upon which the yarn elements composing the band are stored for use. These yarn elements in the fabric described form flat strips composed of groups of loose yarn lying parallel to each other and of a predetermined number and diameter and are applied to the mandrel as the reels revolve about it, all the spools being filled with similar yarn elements composed of loose yarns equal in the number of yarns so that all the yarn elements which compose the band will be exactly alike. The spools are detachably secured to the reels in the manner described in my former application and are spaced thereon in such a manner as to apply the yarn elements in equally spaced rows upon the mandrel, to form the laminated-cohesive-interwound band described in my previous application, 600,315.

Elongated guide rollers $C'$, $C'$ first receive the yarn elements from the spools and guide them between pairs of flanged and spring pressed guide rollers $C^2$, $C^2$ and R, R and thence to the flanged guide roller $C^3$, $C^3$ rotatably mounted upon the radial rods $C^4$, $C^4$.

The rods $C^4$ extend across the faces of the reels and are spaced out from the faces of the reels and from each other so as not to interfere with each other as the reels revolve in the opposite directions. For convenience in gaining access to the spools the rods $C^4$ are set substantially directly over each other in reels rotating in the same direction.

If the rods are too far apart or not far enough apart the yarn elements will overlap, depending upon the width of said elements and the diameter of the mandrel or forming tube.

The tapered end of the mandrel permits of reducing the diameter of the tubular band after it has been first more openly wound in a laminated form under slight tension upon the larger diameter and also permits of forming the band of yarn elements at a wider angle upon the larger diameter of the mandrel, and the pulling of the band over the smaller diameter has the effect of reducing the diameter and simultaneously drawing the yarn elements to a narrower angle, thus overcoming the difficulty found in winding at so small an angle on a very small mandrel which might not sustain the necessary pressure without undue deflection. In this manner for example, yarn elements wound and laminated at an angle of approximately 15° upon the larger diameter with open spaces can be drawn out to a compact form with the yarn elements assuming an angle of approximately 8° with the side of the completed band and without any spaces between the composing elements.

The winding of the yarn elements upon a smooth polished mandrel at a small angle is extremely difficult since they easily slide out of their proper positions, especially when passing yarn elements wound previously thereon in the opposite direction.

By winding the yarn elements first on the large diameter of the mandrel a sufficiently small angle may be chosen to facilitate speed of production and at the same time large enough to overcome the difficulties attendant upon winding at a small angle. The small angle of the yarn elements in the band is essential as the amount of stretch in the finished band decreases with the decrease in size of the angle.

The construction of the forming tube or mandrel differs from the one described in my previous application in being closed at the outer end. It is also flattened at the outer extremity at $X'$ to shape the tubular fabric into a flattened form ready for the application of the pulling and drying rolls.

The portion $B^5$ of the forming mandrel is cylindrical and is solid at the outer end, and the inner portion is hollow at D to receive the fluid rubber. This portion is provided with a cylindrical close fitting valve $D'$ which is provided with perforations $D^2$, $D^2$ adapted to register with corresponding perforations $D^3$, $D^3$ in the walls of the tube $B^5$ when the machine is in operation, and can be closed by rotating the valve when the machine stops.

Figures 5, 6, 7, 8, 9, 10:
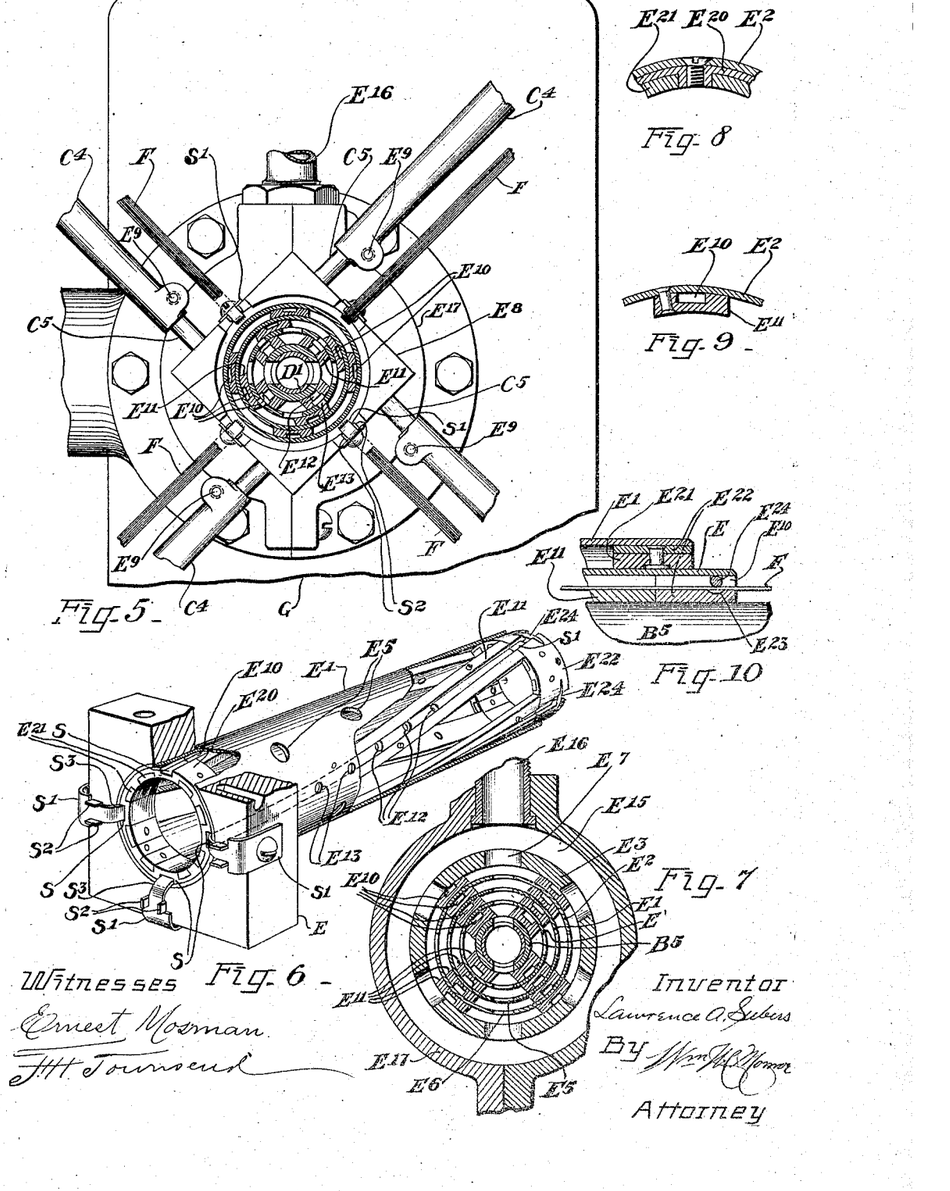
Fig. 5 is a transverse section of the rotating cylinder shown in Fig. 4 and shows the yarn element guiding rods which also serve as rotating means for the guiding cylinders. This section is taken on line $c$—$c$ Fig. 4.
Fig. 6 is a perspective view of one of the cylinders, showing portions broken away to disclose the yarn element guides thereunder.
Fig. 7 is an enlarged transverse section of the forming tube and cylinders on line $b$—$b$ Fig. 4.
Fig. 8 is a partial transverse section of one of the cylinder end guide rings containing self lubricating bearing strips, and shows means of attachment of the ring to the cylinder.
Fig. 9 is a transverse section of one of the yarn element guide strips showing method of attachment to the cylinder.
Fig. 10 is a longitudinal section of part of two of the concentric cylinders showing at the extremity of the outer one the end guide ring and the self lubricating bearing strip riveted to the inner surface thereof while within the inner cylinder is shown the guide passage for one of the yarn elements and a partial closure for the passage arranged to prevent loss of rubber therethrough, and a depression adapted to enable a knot or other obstruction in the yarn element to pass without breaking the latter.
Figure 12:
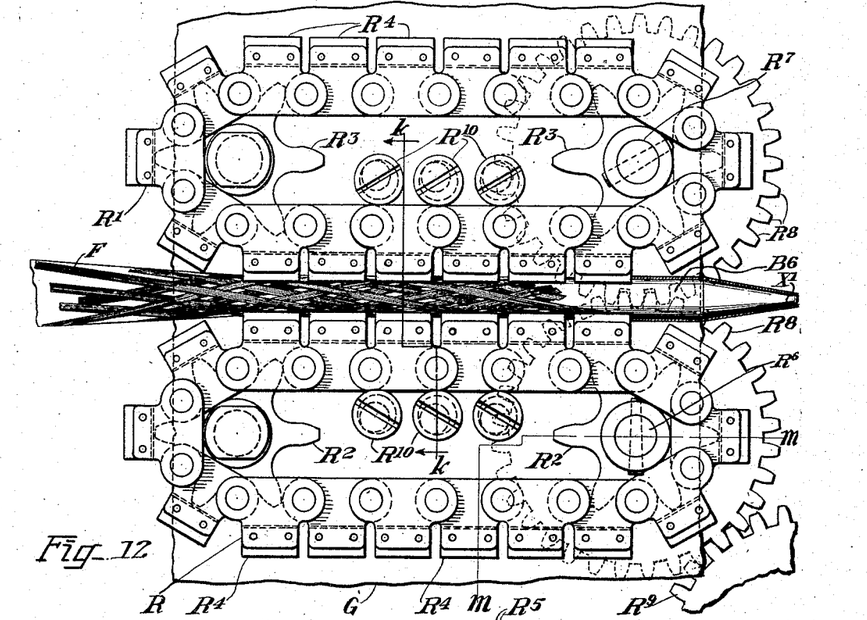
Fig. 12 is a plan view of the sprocket chain mechanism which aids in moving the band along the forming tube to the combined fluted pulling and drying rolls.
Figures 13, 14, 15:
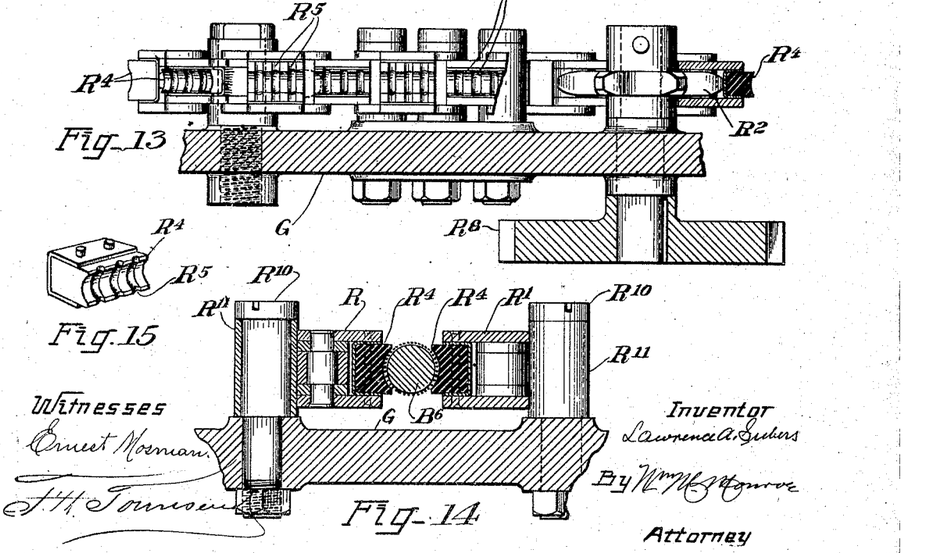
Fig. 13 is a section on line $m$, $m$ Fig. 12 viewed from below.
Fig. 14 is a transverse section on line $k$—$k$ Fig. 12 showing the rollers on the adjusting eccentric pins which thrust the chain against the band on the forming tube.
Fig. 15 is a perspective view of one of the chain blocks.

The outer extremity $B^6$ of the mandrel is inserted in the end of the tubular portion $B^5$ and is secured by the pin P. The forming mandrel is longitudinally adjustable by being threaded in the tube Y and locked by the lock nut W. Inclosing the portion $B^5$ of the forming tube are a series of superimposed hollow cylinders E, $E'$, $E^2$ and $E^3$ Fig. 4 and Fig. 5. These cylinders are all perforated except the outer one at $E^4$, $E^5$, $E^6$ and $E^7$ to permit of free communication between their interiors and the interior of the forming tube so that the rubber will circulate freely through them. These cylinders are employed as coating and permeating means for the yarn elements F, F which compose the fabric band, and the yarn elements F are guided through them to the mandrel, and exposed on all sides to the fluid rubber at the same time.

The cylinders are rotated alternately in opposite directions by means of the rods $C^4$, each set of rods (one set for each reel) being secured in a solid block $E^8$, $E^8$ attached to the outer end of a corresponding cylinder. Each rod is adjustably clamped at $E^9$ through the pin $C^5$ to its respective block. By means of these guiding and coating cylinders the yarn elements are individually coated and are severally led to their exact positions upon the mandrel, and the guiding devices are so arranged as to apply the yarn elements at exactly the required relative angles and also to keep the said elements from adhering together and from being entangled.

It is obvious that the yarn elements may be passed uncoated through rotating concentric cylinders similar to those herein described and coated with liquid rubber cement or other adhesive substance at the point of interwinding and laminating upon the forming tube, without departing from the spirit of the invention or scope of the claims.

The yarn elements F in this machine comprises several yarns wound side by side upon the spools C, C and are drawn from the reels over the guiding rolls described, directly into guiding grooves $E^{10}$, $E^{10}$ formed in bars $E^{11}$, $E^{11}$, secured in the cylinders. Each bar is perforated at $E^{12}$, $E^{12}$ at intervals to permit the rubber to enter the grooves, and the inner cylinders are perforated at $E^{13}$, $E^{13}$, above the grooves for the same purpose. The bars $E^{11}$, $E^{11}$ containing the guiding grooves $E^{10}$, $E^{10}$, for the yarn elements F, F, may extend beyond the end of the rotating cylinders E, $E'$, $E^2$ and $E^3$ to a desired point and in the direction the yarn elements naturally assume at the angular degree of lamination desired.

The outer cylinder $E^3$ is provided with an annular groove $E^{15}$ into which the rubber enters from the pipe connection $E^{16}$ so that the rubber is applied to the cylinders both from internal and external sources. The cylinder $E^3$ rotates in a hollow head $E^{17}$ having self lubricating washers $E^{18}$ and the head is firmly supported upon the end of a vacuum chamber G, and forms the entrance for the forming tube to the chamber. The head $E^{17}$ is formed in halves bolted together for access to the mandrel at the point of winding, and the yarn elements as they leave the concentric cylinders E, $E'$, $E^2$ and $E^3$ are wound about the forming tube $B^6$ subjected to the vacuum maintained in the chamber so as to evaporate the solvent and leave the yarn elements coated and permeated with rubber.

A conical wall $E^{19}$ is formed in the hollow of the head, the edges of which form an opening Q just large enough to permit the tubular band to pass. Underneath the edge of this opening an annular recess $Q'$ is formed in the surface of the mandrel which permits small obstructions to pass such as balls of rubber or knots on the yarns, so that the yarns will not break.

The yarn elements pass into the slots or channels in the cylinders through the openings S and springs $S'$ fastened to the blocks are provided with flanges $S^2$ which serve as guides between which the yarn elements pass.

The springs are provided with curved extremities $S^3$ which enter the openings S and when the yarn elements are withdrawn they stop these openings to prevent the rubber from oozing out. They are compressed by the yarn elements sufficiently to permit them to pass without releasing the rubber.

Attached to the end of the rotating cylinders E, $E'$, $E^2$ and $E^3$ where the yarn elements F, F enter, are guide rings $E^{20}$, $E^{20}$, in which are openings S for the yarn elements and guiding springs $S'$, and which have self lubricating strips $E^{21}$, $E^{21}$ fastened to their inner surface. Attached to the other end of these cylinders E, $E'$, $E^2$ and $E^3$ are corresponding guide rings $E^{22}$, $E^{22}$ which have openings $S'$, lubricating strips $E^{21}$, $E^{21}$, partial closures or inwardly projecting members $E^{24}$, $E^{24}$ to govern the amount of rubber coating on the yarn elements, and recesses $E^{23}$, $E^{23}$ underneath these closures to permit the passage of knots or other obstructions on the yarn elements.

The tube Y is stationary and the valve rotates in the stuffing box $D^4$ and a tube $D^5$ supplies the fluid rubber.

H is a chamber not claimed herein in which a vacuum is produced as nearly perfect as practicable by suction through the tube $H'$. In this chamber the solvents in which the rubber coating has been dissolved are evaporated to a predetermined degree, and the band is so supported as to expose as much of its surface as possible to the evaporating influence of the vacuum and heat in a predetermined space of time. In this chamber are shown three series of pulling and drying rolls $H^2$, $H^3$ and $H^4$ over which the band passes in turn, backward and forward as it is produced from the mandrel. These rollers in each series are placed closely together in staggered rows so as to leave as little interval between the rollers as practicable, so that the tube is given no opportunity to resume its tubular or rope like form until completely dried. A coil of steam pipe $H^{13}$, or any other suitable heating system, furnishes heat to assist in the evaporation of the solvents from the liquid rubber cement or other adhesive material used on the laminated band. The conical wall $E^{19}$ incloses a chamber communicating with the chamber H through the opening Q and hence is subjected to the same degree of vacuum as that in the chamber H, and serves as a drying or evaporating means for the yarn elements F prior to winding them on the mandrel and leaves them sufficiently frictioned to adhere together.

The rollers are similarly and uniformly fluted and are concentrically mounted with and attached to spur gears which are geared to travel at an absolutely uniform rate of speed. After passing over the first or upper series of rollers $H^2$ to dry the band as it comes from the mandrel it passes through a coating device $H^5$ to provide an exterior coating and thence passes over the second series of rollers $H^3$ for a second drying treatment, and passes through a second coating device $H^6$ of the same construction as $H^5$ and thence over the third series of rollers $H^4$ to dry the second coating. After this second coating is dried it passes through an aperture $H^7$ in the end wall of the chamber as practically a perfect flattened band.

The rollers are preferably formed of aluminum or other non-adhesive material so that the band will not stick to them. This construction is clearly shown in Figs. 5 and 6.

All the rubber fluid coating and supplying devices are provided with means for automatically closing the valves or jaws, when the machine is stopped, to prevent flooding them with fluid rubber which would dry thereon and prevent the use of the machine until they were cleaned, and the same means serves to open them automatically when the machine is started. To accomplish this a belt shifter consisting of belt fingers T sliding upon a rod $T^{28}$ is employed in connection with the tight pulley T' and the loose pulley $T^2$. A rock arm $T^3$ mounted upon the vertical shaft $T^7$ operates this shifter. Mounted upon the same shaft $T^7$ the arm $T^4$ through the link $T^5$ and rock arm $T^6$ serves to operate the valve stem $T^{29}$ in the pipe which supplies rubber to the outer cylinder. The vertical shaft $T^7$ and one arm of the triple arm lever $T^8$, link $T^9$, bell crank $T^{10}$, a link $T^{11}$, an arm $T^{12}$, a vertical shaft $T^{13}$, and bevel gears $T^{14}$ rotate the tubular valve D' within the mandrel Y. A second arm of the triple arm lever $T^8$, a link $T^{15}$, bell crank $T^6$ and shaft $I^{12}$, operate the rock arms $I^{11}$, $I^{11}$ for the band coating device $H^6$ in the vacuum chamber, and from the shaft $I^{12}$ an arm of the bell crank $T^{16}$, a link $T^{18}$, rock arms $T^{19}$, link $T^{20}$, rock arm $T^{30}$ and shaft $I^{13}$ operate the rock arms $I^{11}$, $I^{11}$ for the band coating device $H^5$ in the vacuum chamber. The shafts $I^{12}$ and $I^{13}$ pass through stuffing boxes $I^{14}$ into the vacuum chamber H. This mechanism is operated by means of a lever $T^{21}$, a sliding bar $T^{22}$ which passes underneath the machine and is provided with a pin $T^{23}$ which is engaged by a third arm of the triple arm lever $T^8$ on the shaft $T^7$.

A band brake $T^{25}$ is operated simultaneously with the closure of the valves by means of the bell crank $T^{26}$ and link $T^{27}$ operated in turn by the arm $T^4$ previously described.

The vertical shaft $T^7$ is supported in the brackets $T^{31}$ and $T^{32}$, the latter also supporting bell crank lever $T^{26}$. The vacuum chamber is provided with glass covered openings O', O' sufficiently strong to sustain the external pressure, and bell crank levers $O^2$ and cleats $O^3$ are provided for fastening the hinged front $O^4$.

In Figs. 12 to 15 inclusive is shown the mechanism for pushing the band off from the mandrel and is employed as an adjunct to the action of the pulling rollers, so as to prevent the pulling action from distorting the band, and equalizes the movement. Here R and R' are endless chains above and below the mandrel mounted on sprocket wheels $R^2$ and $R^3$ respectively. Each chain is provided with blocks $R^4$, $R^4$ which are recessed to conform to the shape of the band on the mandrel and are transversely grooved at $R^5$ to permit the vacuum to affect the evaporation of the solvent from the band as it passes along the mandrel or forming tube. The sprocket wheels are mounted at one end of the device upon shafts $R^6$, $R^7$ which are geared together at $R^8$, $R^8$, and are operated by an auxiliary gear $R^9$ actuated by one of the gears which drive one of the pulling rollers. These chains are vertically adjustable to vary the pressure on the band by means of eccentric pins $R^{10}$, $R^{10}$, carrying rolls $R^{11}$, $R^{11}$, and attached to the vacuum chamber G. Means for closing the aperture $H^7$ as the band passes through it and for pulling the band therethrough are shown in Fig. 1.

In Figs. 2 and 3 are shown the various operating means for the machine. Here V is the belt shaft, T', $T^2$ the pulleys, V', $V^2$, $V^3$ and $V^4$ the driving gears for the reel drive shaft. Gears $V^2$ and $V^3$ are mounted on a swinging arm $V^{14}$ so that if a change in speed is desired the gear $V^3$ may be changed. $V^5$, $V^6$, $V^7$, $V^8$, $V^9$, and $V^{10}$ are external gears for driving the pulling and drying rollers in the vacuum chamber, and $V^{11}$, $V^{12}$ and $V^{13}$ are shafts therefor.

I do not confine myself to the exact arrangement of the various mechanical parts, provided any modifications would be of material advantage in the development and perfection of the machine as outlined by the drawings and specifications of this machine, nor do I confine myself to the use of liquid rubber cement or other liquid adhesive material, but may use this rubber or other adhesive material in any other form desired for the purpose indicated.

I have shown in the drawings and particularly described in the specification certain preferred embodiments of my invention, but these embodiments are to be regarded as illustrative only, and I do not intend to limit myself to the details thereof.

It is obvious that my invention is capable of many modifications, all of which are included within the scope of the claims.

Having described the invention what I claim as new and desire to secure by Letters Patent is:

1. In a band forming and coating machine for constructing a flattened band from a series of flattened elements, a stationary former unsupported at one end, series of reels rotatable about said former, the reels in one series revoluble in the opposite direction to the reels in the other series, and alternating therewith in position, and a series of coating devices rotatable about said former, one for each reel.

2. An automatically acting machine for constructing a tubular laminated band from flexible elements, comprising, a fixed former having a free outer end, rotatable devices for winding the flexible elements about the former, said rotatable devices including rotatable coating means for said flexible elements and means for supplying said coating means with fluid coating material.

3. In an automatically acting device for constructing a laminated tubular fabric from flexible elements, a former having a free outer end, band guiding devices rotatable in opposite directions about said former for applying said flexible elements in predetermined order upon said mandrel, said band guiding devices serving also to apply fluid rubber to said flexible elements, means for pulling said tubular fabric from the free end of said former, said pulling means serving also as a flattening means.

4. In an automatically acting device for constructing a laminated fabric of interwound cohering flexible members, a hollow former, devices rotatable about the former in opposite directions for applying the flexible members to said former, a head in which said element applying devices rotate about the former, means for supplying a fluid coating material to said hollow former and head, and thence to said element applying devices, and means for pulling and for simultaneously pushing said fabric from said former.

5. In a machine for winding flexible elements upon a former to construct a laminated fabric in which the flexible elements cohere together, the combination with the former, of hollow concentric guide members containing the coating material and rotatable about the former in opposite directions, said rotatable guide members provided with guide slots for the said flexible elements, and means for supplying said hollow guide members with fluid coating material.

6. The combination with a hollow former free at one end, of hollow guide members rotatable about the former, said guide members provided with longitudinal guiding slots, the said hollow members communicating with each other, means for supplying a fluid coating material to the hollow former and means for supplying fluid coating material to the outer hollow guide members.

7. In combination, a hollow former, said former provided with lateral openings, a series of concentric hollow guide members rotatably mounted upon said former, said guide members provided with lateral openings and communicating with each other through said lateral openings, and provided with longitudinal spiral guide slots, a head in which said concentric guide members are mounted, said head provided with an inlet opening and said outer guide member having an annular opening communicating with said inlet opening in said head, the valve in said former having lateral openings, adapted to register with the lateral openings in the inner guide members, and a valve for controlling the admission of coating material to said annular inlet opening.

8. In combination, a former free at one extremity, a series of hollow cylindrical members concentrically arranged about said hollow former, the said former and cylindrical members provided with means of communicating with each other, spirally arranged longitudinal guides in said cylindrical members, openings in said guides communicating with said hollow cylindrical members, resilient means for closing the outer ends of said guides, and means for supplying said hollow cylindrical members with a fluid coating material.

9. In a device for winding flexible elements upon a former and for coating the same, to construct a laminated band therefrom, a hollow former, and a series of cylindrical hollow members concentrically arranged upon said former, and communicating with said former and with each other, a series of guides spirally and longitudinally arranged in said cylindrical members, said guides provided with lateral openings, means for providing elastic closures for the outer ends of said guides, means permitting the passage of knots and other obstructions at the inner extremities of said guide, and means for rotating said cylindrical hollow members in different directions.

10. In combination, a series of reels rotatable in opposite directions, and a series of spools thereon carrying flexible elements, a former having a free inner extremity, a series of concentric hollow guide members upon said former, means for operatively connecting said reels with respective hollow guides members, guides passing longitudinally through said concentric guide members, and adapted to receive and guide said flexible elements to said former, and means for supplying fluid coating material to said hollow guide members.

11. In a machine for forming a band from flexible elements, in combination, a former, coating and guiding devices concentrically mounted upon said former, and rotatable thereabout in opposite directions, through which coating and guiding devices said flexible elements are separately fed to the former, spaced channels in said coating and guiding devices, a vacuum and heating chamber into which said former extends, whereby the coating on each flexible element is exposed for drying before the flexible elements are overlapped upon the former, means for supplying the channels in said coating and guiding devices with fluid coating material, and means for preventing the escape of said coating material from said channels.

12. In a machine for constructing a laminated band from overlapping cohering flexible elements, a former, rotating mechanisms for applying the said elements to the said former at predetermined angles, said mechanisms serving also as coating instrumentalities for the separate elements, and serving to space them apart to guide and prevent their adhesion and means for evaporating the solvents contained in the several coatings before they overlap upon the former.

13. In a machine for constructing a laminated cohering band from flexible interwound elements, a former free at one end, means for separately guiding and coating said elements and for applying them at predetermined relative angles to said former, means for drying said elements prior to overlapping them on the former, and means for rotating said guiding and coating elements.

14. In a machine for constructing a laminated cohering band from flexible interwound elements, a former free at one end, guiding, coating and spacing members for said flexible elements rotatable about said former, means for drying the several coatings on said flexible elements before they overlap on the former, and means for removing the band from the former.

15. In a machine for constructing a laminated band composed of cohering interwound flexible elements, a former, mechanism for spacing apart and separately coating said elements, said mechanism rotatable about said former.

16. In combination with a former, means for winding coated flexible elements thereon to form a fabric, a pushing device and a pulling device for the fabric, and a vacuum chamber in which said pushing and pulling devices are located.

17. In combination with a former, devices rotatable thereabout for separately guiding spacing and coating band elements prior to laying them upon said former to construct a laminated cohering fabric, a vacuum and heating chamber in which said band elements are exposed prior to laying them on said former, and pulling and pushing devices for said fabric.

18. In a former, a fixed inner hollow portion, a reduced cylindrical outer portion and tapered intermediate portion, and a flattened free outer extremity, and a tubular valve in said hollow portion, and lateral registering openings in the walls of said former and valve.

19. In a machine for constructing a laminated fabric band from flexible elements, a series of oppositely rotating reels and spools thereon, a former, a series of guiding and coating devices for said flexible elements rotatable with said reels about said former, and a vacuum chamber in which said flexible elements are exposed, said guiding devices adjustable to vary the angle at which the said flexible elements are laid.

20. The combination with a former, of a series of concentrically arranged devices for spacing and guiding flexible elements to said former, and for coating each flexible element and means for drying the said elements prior to applying the same upon the former.

21. The combination with a hollow former, of a series of concentrically arranged devices upon the former for coating, spacing and guiding flexible elements to the former, said concentric devices comprising a each of said cylinder and channeled guide members longitudinally arranged in said cylinders, an outer support in which each cylinder is secured, means for rotating said outer supports, said hollow former and cylinders provided with lateral openings for the passage of a coating fluid, and the outer cylinder support provided with an annular passage communicating with the interior of said cylinder, a head provided with inlet openings communicating with said annular passage, and said hollow former having an inlet opening for fluid coating.

22. In combination with a hollow former on which a series of flexible elements are wound to form a fabric, a series of cylinders concentrically arranged thereon, each cylinder having openings permitting a coating fluid to pass therethrough, a channel longitudinally and spirally arranged in each cylinder from end to end, a support for each cylinder, a spring for each channel secured to its respective cylinder support, each spring having one extremity curved to enter the outer mouth of its respective channel and form an elastic closure therefor, a depression in the floor of each channel near its inner end, and a transverse member in the roof of the channel over said depression.

23. In a channeled guide and coating device for a flexible element, a support for the said guide, a spring having an outer extremity forming an elastic closure for the outer end of said channel, and means for supplying said channel with fluid coating material.

24. In a channeled guide and coating device for a flexible element, a support for the said guide, a spring having one extremity inserted in one end of said channel and forming an elastic closure therefor, a depression in the floor near the other end of the channel, and a projection in said channel over said depression.

25. In combination a former having a reduced cylindrical portion, an intermediate tapered portion and a free extremity, a vacuum chamber into which said former extends, a funnel shaped wall for said chamber inclosing said former, said former provided with an annular recess in its surface alining with the reduced extremity of said funnel shaped wall.

26. The combination with a former, and mechanism for winding a fabric thereon composed of cohering flexible elements, of a pushing device comprising series of transversely channeled members operatively connected together, said channeled members adapted to engage said fabric on opposite sides, and moving in a common direction.

27. In a device for pushing a frictioned fabric from a former, endless series of longitudinally arranged members having transverse channels in their engaging faces, said members engaging said fabric in turn and moving in a common direction, and means for radially adjusting the engaging members.

28. In combination with a former, fixed at one end and having a free extremity, rotatable guide members concentrically mounted about said former, and arranged to apply said flexible elements in regularly spaced rows upon said former to form an interwound band, and means for pulling said band from said former.

29. In an automatically acting machine for constructing a tubular laminated band from flexible elements, a fixed former having a free outer end, annular rotatable guide member concentric with said former for winding and regularly spacing said flexible elements about said former, and reels upon which said flexible elements are stored, said reels rotatable with said guides alternately in opposite directions.

30. In a device, of the character described, a mandrel, a series of reels rotatable thereabout in opposite directions, an annular guide support operatively connected with each reel, a series of channeled guides secured to said support and encircling said mandrel, spools for storing flexible elements upon said reels, and means for guiding said flexible elements from said spools to said channeled guides.

31. In a machine for making a fabric tube, a mandrel or former having positions of different diameters, means for interwinding flexible elements on the larger portion of said mandrel at a relatively large angle to the axis of the mandrel, and means for drawing the fabric tube thus formed onto the smaller portion of the mandrel under tension whereby the angle of the said elements to the axis of the mandrel is described.

32. In a machine for making a fabric tube, a mandrel or former having portions of different diameters, means for interwinding flexible elements on the larger portion of said mandrel at a relatively large angle to the axis of the mandrel, means for drawing the fabric tube thus formed onto the smaller portion of the mandrel under tension whereby the angle of the said elements to the axis of the mandrel is decreased, and means contacting with the outer face of the fabric for limiting its movement and preventing distortion by said first mentioned means.

33. In a tubular fabric forming machine, in combination, a series of concentric reels rotatable alternately in opposite directions, a stationary central mandrel, a tapered portion and reduced outer extremities therefor, spools on which flexible band elements are stored, means for guiding said flexible elements to said mandrel, means for rotating said reels to wind said flexible elements on said mandrels, and means for pulling said bands over the reduced extremity of said mandrel.

34. In a machine for forming a tubular band of laminated cohesive-interwound flexible element in an open equally spaced manner and afterward reducing the diameter thereof, in combination, a mandrel having a tapered portion and reduced outer extremity, concentric reels revoluble around said mandrels, alternate reels revolving in opposite directions, spools thereon on which said flexible elements are stored, means for guiding said flexible elements and for rotating said reels to wind said flexible elements on said mandrel and means for pulling said open wound band over the tapered and reduced portions of said mandrel.

35. In a machine for making an interwound tubular band, in combination, a mandrel having a relatively large portion, a relatively reduced free end, and a portion directly connecting said large and reduced portions, means for winding flexible elements on said relatively large portion to form an interwound band about said large portion, and means for pulling said band off of said reduced portion.

36. In a machine for interwinding flexible elements in combination, a plurality of concentric rotatable reels, certain of said reels revolving in one direction and the others in the opposite direction, a central mandrel about which said reels revolve, and means carried by said reels for winding flexible elements on said mandrel.

37. In apparatus of the kind described in combination, a mandrel for supporting an interwound band and means for pulling the band along said mandrel comprising a chain having gripping shoes thereon for gripping the band, and adjustable bearing numbers for forcing the gripping shoes against the band mounted in contact with the inner surface of the chain.

In testimony whereof, I hereunto set my hand this 12th day of December, 1911.

LAWRENCE A. SUBERS.

In presence of—
  Scott L. Exline,
  A. T. Osborn.